Nov. 2, 1965    P. E. ARTHER    3,214,861
APPARATUS TO TRAP INSECTS
Filed March 23, 1964
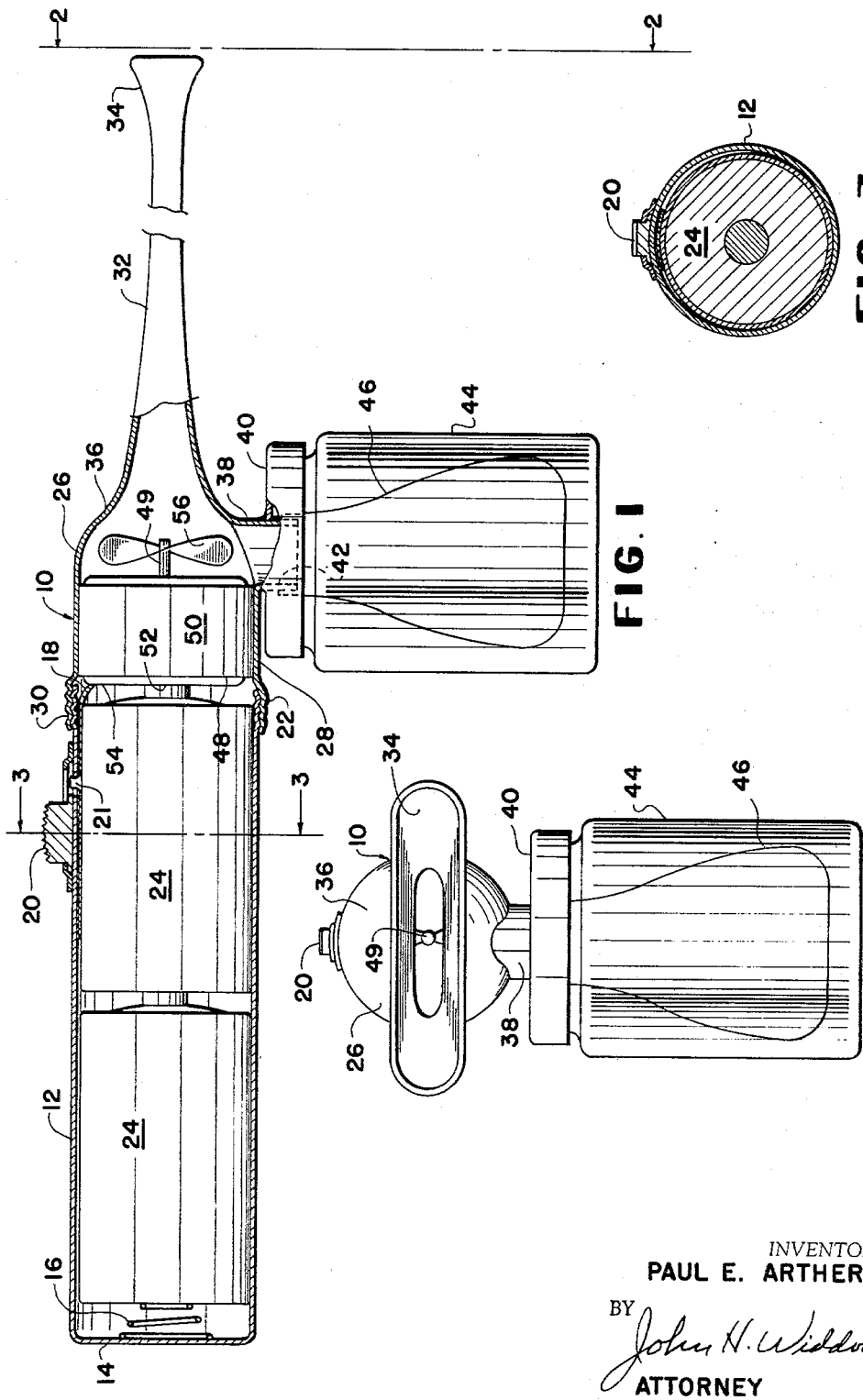
INVENTOR.
PAUL E. ARTHER
BY John H. Widdowson
ATTORNEY

3,214,861
APPARATUS TO TRAP INSECTS
Paul E. Arther, 5622 S. Delaware, Littleton, Colo.
Filed Mar. 23, 1964, Ser. No. 354,004
2 Claims. (Cl. 43—139)

This invention relates to insect control. More specifically this invention relates to an apparatus to trap insects. Still more specifically this invention relates to a portable battery powered device for catching flies and other insects.

Devices to trap insects by drawing them into an enclosure on a current of air are in general old. These known devices have not proven entirely satisfactory in use for a variety of reasons. In general, these devices are relatively heavy and cumbersome apparatus that are designed to be permanently mounted in a desired location frequented by insects. Often some form of enticement, such as a light, is used to bring the insects within range of the device. These devices are satisfactory for the intended purpose in certain instances, but are not designed to be used to actively pursue insects. These devices are relatively inefficient since they must be left running or in operation for long periods of time in order to effectively control the insect population in a given vinicity. The continuous operation is objectionable because of the noise produced and the electrical power dissipated. The devices are often unsightly, expensive to purchase, and maintain.

Portable devices to trap insects are also old. These devices are powered by a long cord having a plug disposed into an electrical outlet receptacle. A cord hampers free movement of the one operating one of these devices. In addition these devices are difficult to maneuver, heavy, expensive, and have no convenient provision to hold and dispose of insects that are trapped.

I have invented a new device to catch insects. The device of my invention has a tube with an open end, an enclosure means in communication with the tube, and a motor mounted on the tube. Means are provided to selectively energize the motor. An impeller is mounted on and driven by a motor. The impeller is adapted to, in use, draw air and insects into the open end of the tube and deposit same into the enclosure means.

A specific embodiment of my device to trap insects utilizes conventional dry cell batteries disposed in a case similar to a case in a flashlight or the like. The container for receiving the insects is releasably mounted on the tube adjacent to the impeller. A pervious bag is disposed within the container which can be saturated with insect spray or the like to kill the insects so trapped if they survive the journey past the impeller.

The portable insect catcher of my invention solves all the problems associated with analogous devices to trap insects known to the prior art. My device to trap insects is battery powered and is portable. It can be used to actively pursue an insect, which can be easily accomplished since the device is relatively light in weight. It is efficient and inexpensive to operate since the motor used to draw air through the tube need be energized only for short periods of time when an insect is in the vicinity of the end of the tube. My device is relatively inexpensive to manufacture and maintain in operation. The device also has a provision for conveniently handling and disposing of insects and the like that have been captured by the device. The bag in the specific embodiment of my invention can be made disposable and thrown away after use. Since my device is portable, there is no necessity for providing an unsightly enticement for insects.

An object of this invention is to provide an apparatus to control insects.

Still another object of this invention is to provide a portable battery powered insect catcher.

Still another object of this invention is to provide a new portable device to trap insects that is light in weight and simple in construction.

Yet another object of this invention is to provide a new device to trap insects having a provision for conveniently storing and disposing of dead insects.

Yet another object of this invention is to provide a new device to trap insects that is adapted to utilize conventional dry cell batteries, and a conventional flashlight case as a part thereof.

Still another object of this invention is to provide a new device to trap insects that is inexpensive to manufacture and maintain in operation.

Still another object of this invention is to provide a new device to capture insects that is simple to operate.

Yet another object of this invention is to provide a new device to capture insects that is adapted to provide a powerful intake of air capable of drawing the insect into the device.

Other objects and advantages of the invention will be apparent to those skilled in the art from the disclosure set forth herein.

Drawings of preferred specific embodiments of the invention accompany and are a part hereof and such are to be understood to not unduly limit the scope of the invention. In the drawings, FIG. 1 is a side elevational view in partial cross section and in broken section of a preferred specific embodiment of my new device to trap insects.

FIG. 2 is a front elevational view taken on line 2—2 of FIG. 1 of my device to trap insects.

FIG. 3 is a cross sectional view taken on line 3—3 of FIG. 1.

The following is a discussion and description of the new device to trap insects of my invention made with reference to the drawings, wherein the same reference numerals are used to indicate the same or similar parts and/or structure. The discussion and description are of preferred specific embodiments of my new device to trap insects, and it is to be understood that such are not to unduly limit the scope of my invention.

Referring now to the drawings, in FIGS. 1-3 there is depicted a specific embodiment of my new battery powered insect catcher 10. The insect catcher 10 of my invention has a cylindrically shaped metal battery case 12 having a closed end 14 and an opposite open end. A coil-type compression spring 16 is secured to end 14 of case 12 in electrical contact therewith. A longitudinally extending insulated conductor 18 is secured to case 12 and has an end protecting out of and slightly beyond the open end. Conductor 18 is insulated from case 12 by positioning a thin layer of insulating material between it and the case, or in any other suitable manner. An electrical switch 20 is mounted on the exterior of case 12 and arranged to either make or break electrical contact between case 12 and the insulated conductor 18. Electrical contact can be made by providing a conducting portion on switch 20 which in one position contacts element 18, or an element in contact therewith, and case 12. Also provided on the case 12 are male threads 22. The case 12, and its associated elements described hereinbefore, is a conventional battery case normally used on a flashlight. It is understood that the case 12 can be of any suitable length and diameter to accommodate any suitable number of batteries 24 of any suitable size. If desired, the case 12 can be made of plastic, or other suitable material with electrically conducting elements therewith to provide means to complete an electrical circuit with batteries enclosed.

A housing 26 is secured to the open end of case 12. The housing 26 has a cylindrical end portion 28 having the same diameter as battery case 12. Male threads 30 are disposed on one open end of the cylindrical end portion 28 and engage the female threads 22 on case 12. The threads 22 and 30 are adapted to releasably join the housing 26 to battery case 12. An elongated relatively slender tubular portion 32 is joined in axial alignment with cylindrical portion 28. The tubular portion 32 has an oblong shaped transverse cross section as illustrated more clearly in FIG. 2 of the drawings. A flared end portion 34 is provided on the end of tubular portion 32. Tubular portion 32 and cylindrical portion 28 of housing 26 are joined with a smoothly tapered junction portion 36. A relatively short tubular portion 38 is joined to the junction portion 36 between the cylindrical portion 28 and tubular portion 32. The relatively short tubular portion 38 is disposed in generally transverse relationship to the axis of the housing 26. An annular shaped cover element 40 having female thread means, and apertures in the top thereof (not shown) is joined to the tubular portion 38. Preferably the tubular portion 38 extends through the cover element a short distance and is indicated on FIG. 1 as number 42. A cylindrical shaped container 44 is releasably joined to the cover element 40. As indicated in FIG. 1 a previous bag 46 is disposed within the container 44 and has its open end releasably joined to the protruding portion 42 of the tubular portion 38. A direct current electric motor 48 having a longitudinally extending shaft 49 is disposed within the cylindrical shaped portion 28 of housing 26. As indicated, the shaft 49 of motor 48 is aligned with the longitudinal axis of housing 26. A means 50 is provided for insulating the motor 48 from the housing 26. The means 50 is preferably a sleeve element made of an electrically insulating material, preferably resilient, that is disposed between the motor 48 and the cylindrical portion 28 of housing 26. The sleeve element 50 is also operative to frictionally mount the motor within the housing 26. The motor 48 is provided with a terminal 52 adapted to engage a central electrode of dry cell battery 24, when the battery is positioned in case 12. This relationship is shown best in FIG. 1. The motor 48 is also provided with an annular shaped terminal that is in electrical contact with the insulated conductor 18. Annular terminal 54 and central terminal 52 constitute the electrical power input terminals of battery 48. It can be seen that by moving the switch 20 to establish electrical contact between the insulated element 18 and metallic battery case 12 the circuit between the terminals of the batteries and the motor is completed to thereby energize the motor 48. Conversely, breaking the electrical contact between conductor 18 and battery case 12 breaks the circuit thereby de-energizing the motor 48. An impeller 56 is mounted on shaft 49 of motor 48. The impeller is preferably positioned adjacent the inlet of tubular portion 38.

In operation the energization of motor 48 causes shaft 49 and impeller 56 to rotate. Rotation of impeller 56 causes a powerful intake of air through the flared end 34 of tube 32. The air is forced downwardly into the pervious bag 46 disposed in container 44. Any insects or the like that are caught into the intake of air through the end of tube 32 are moved inwardly along with the air and consequentially deposited in bag 46. If desired a small amount of insect spray poison, or the like, can be disposed in container 44 to impregnate the bag 46. The insect spray will thereby kill the insects if they are already not dead from passing through rotating impeller 56. The air is then exhausted through the holes provided in the top of cover element 40. The holes can be positioned in any suitable location on container 44. If desired, the bag alone can be used without the container. It can be seen that insects collected in bag 46 can be conveniently disposed of by removing the bag 46 from the end portion 42 of tubular portion 38 and either emptying same or disposing of the bag. Bag 46 can be made of inexpensive pervious material such as coarse paper or the like and can be disposed of after each use or when the bag is full.

While I have described and illustrated preferred specific embodiments of my invention, it is to be understood that the new device to trap insects and elements thereof, disclosed, can be made in other forms than herein described or suggested without departing from the spirit of my invention.

I claim:

1. A portable battery powered insect catcher comprising, a cylindrically shaped metal battery case having a closed end and an open end, a coil type compression spring on said closed end positioned in axial alignment with said case, a longitudinally extending insulated conductor secured to said case having an end protruding out of and beyond said open end, an electrical switch on said case for making or breaking electrical contact between same and said insulated conductor, female thread means on the open end portion of said case, a housing secured to said case comprising, a cylindrical end portion having the same diameter as said battery case, male threads on a first open end of said cylindrical portion to engage said female threads on said case, an elongated relatively slender tubular portion joined in axial alignment to said cylindrical portion, said tubular portion having an oblong shaped transverse cross section, a flared end portion on said tubular portion, a relatively short tubular portion joined to the junction of said cylindrical end portion of said housing and said tubular portion in transverse relationship thereto, an annular shaped cover element having female thread means and apertures joined to said short tubular portion, a cylindrical shaped container having male threads releasably secured to said cover element, and a pervious bag disposed in said container having an open end releasably joined to said short tubular portion, a direct current electric motor having a longitudinally extending shaft disposed in said cylindrical shaped end portion of said housing, a means insulating said motor from said housing, a central terminal on said motor adapted to engage the central electrode of a dry cell battery when positioned in said case, an annular shaped terminal on said motor in electrical contact with said insulated conductor on said case, an impeller on said drive shaft of said motor adjacent said short tubular portion, said insect catcher adapted in use to produce a powerful intake of air through the flared open end of said elongated tube when said motor is energized and draw insects into the end thereof, through said tube, and deposit them into the bag, and exhaust the air through the apertures on the cover element.

2. A portable insect catcher comprising, a battery case having an open end, a longitudinaly extending insulated conductor secured to said case having an end protruding out of said open end of said case, an electrical switch on said case for making or breaking electrical contact between same and said insulated conductor, a housing secured to the open end of said case comprising, an enlarged portion, means for connecting one end of said enlarged portion to the open end of said battery case, an elongated tubular portion having an oblong shaped transverse cross section and joined in substantially axial alignment to said enlarged portion, a flared end portion on said tubular portion, a conduit joined to said housing at approximately the junction of said enlarged portion and elongated tubular portion, a container releasably joined to said housing, said conduit providing communication between said housing and said container, said container having an outlet aperture therein, a pervious bag having an open end disposed within said container and releasably joined to said conduit, a direct current electric motor having a drive shaft disposed in said enlarged portion, a means insulating said motor from said housing, a central electrode on said motor to engage the central terminal of a battery when positioned in said case, an electrode on said motor in electrical contact with said insulated conductor on said case, an impeller on said drive shaft of said motor, said insect catcher adapted in use to produce a relatively powerful intake of air through the flared end of said elongated tube when said motor is energized which intake of air is capable of drawing insects and the like into the end of the tube, and deposit same into said bag, and exhaust air through said aperture in said container means.

References Cited by the Examiner

UNITED STATES PATENTS

| | | | |
|---|---|---|---|
| 993,644 | 5/11 | Brisbane | 43—139 |
| 1,165,712 | 12/15 | Rea | 43—139 |
| 1,377,201 | 5/21 | Jolly | 43—139 |
| 2,205,599 | 6/40 | Mitchell | 15—344 |
| 2,214,193 | 9/40 | Cowles | 15—344 |

FOREIGN PATENTS

| | | |
|---|---|---|
| 1,196,420 | 5/59 | France. |
| 717,578 | 10/54 | Great Britain. |
| 795,118 | 5/58 | Great Britain. |

SAMUEL KOREN, *Primary Examiner.*

ABRAHAM G. STONE, *Examiner.*